US011616912B2

United States Patent
Chu et al.

(10) Patent No.: US 11,616,912 B2
(45) Date of Patent: *Mar. 28, 2023

(54) FULL-SCREEN DISPLAY WITH SUB-DISPLAY CAMERA

(71) Applicant: Google LLC, Mountain View, CA (US)

(72) Inventors: Ping Tong Chu, Sunnyvale, CA (US); Chung Chun Wan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,219

(22) Filed: Aug. 3, 2021

(65) Prior Publication Data

US 2021/0377449 A1 Dec. 2, 2021

Related U.S. Application Data

(63) Continuation of application No. 16/671,896, filed on Nov. 1, 2019, now Pat. No. 11,115,596.

(51) Int. Cl.
*H04N 5/232* (2006.01)
*G02B 26/08* (2006.01)
*G09G 3/3208* (2016.01)
*H04N 5/225* (2006.01)

(52) U.S. Cl.
CPC ..... *H04N 5/23293* (2013.01); *G02B 26/0816* (2013.01); *G09G 3/3208* (2013.01); *H04N 5/2254* (2013.01)

(58) Field of Classification Search
CPC ............. H04N 5/23293; H04N 5/2254; G02B 26/0816; G09G 3/3208
See application file for complete search history.

(56) References Cited

U.S. PATENT DOCUMENTS

| 2003/0035652 A1* | 2/2003 | Kubo | H04N 5/238 348/E5.04 |
| 2005/0104801 A1* | 5/2005 | Sugiura | H04N 13/324 348/E13.067 |
| 2006/0131492 A1* | 6/2006 | Kobayashi | G02B 27/017 250/234 |
| 2007/0041723 A1 | 2/2007 | Gutierrez et al. | |

(Continued)

FOREIGN PATENT DOCUMENTS

| EP | 3518016 | 7/2019 |
| WO | WO 2020/031005 | 2/2020 |

OTHER PUBLICATIONS

PCT International Search Report and Written Opinion in International Appln. No. PCT/US2020/050908, dated Nov. 24, 2020, 16 pages.

(Continued)

*Primary Examiner* — Ahmed A Berhan
(74) *Attorney, Agent, or Firm* — Fish & Richardson P.C.

(57) ABSTRACT

An apparatus includes a camera, a primary display panel including a pixel array and an aperture adjacent the pixel array, an auxiliary display, and an optical assembly including a reflecting optical element and an actuator coupled to the reflecting optical element. The actuator is configured to switch the reflecting optical element between a first arrangement and a second arrangement. The first arrangement defines an optical path from the aperture to the camera and the second arrangement defines an optical path from the aperture to the auxiliary display.

20 Claims, 4 Drawing Sheets

(56) References Cited

U.S. PATENT DOCUMENTS

2012/0287327 A1* 11/2012 Border .................. G03B 15/10
                                                  348/333.09
2014/0055624 A1*  2/2014 Gaines .................... G02B 5/08
                                                  348/207.1
2016/0241760 A1   8/2016 Pheng

OTHER PUBLICATIONS

PCT International Preliminary Report on Patentability in International Appln. No. PCT/US2020/050908, dated May 12, 2022, 9 pages.

* cited by examiner

FULL-SCREEN DISPLAY WITH SUB-DISPLAY CAMERA

CROSS REFERENCE TO RELATED APPLICATION

This application is a continuation of U.S. application Ser. No. 16/671,896, filed on Nov. 1, 2019. The disclosure of the prior application is considered part of and is incorporated by reference in the disclosure of this application.

FIELD

The disclosure relates to displays with integrated front-facing sensors and mobile devices including the same.

BACKGROUND

Many mobile devices, such as smartphones and tablet computers, feature front-facing sensors, i.e., sensors that face the user during use. Such sensors include, for example, cameras (e.g., so-called "selfie" cameras), ambient light sensors, proximity sensors, finger print sensors, and IR sensors that can be used to detect 3D facial profiles. Other front-facing components include flood illuminators, speakers, and microphones, for example.

Another trend for such mobile devices includes shrinking the display's bezel, the rim that holds the display and touch panel in place. In other words, there is a trend to have as much of the front of the device be occupied by the display, where a so-called edge-to-edge display would be considered ideal. Because various front-facing sensors are often housed in the bezel, the trend towards smaller bezels have presented challenges for device designers, who have opted for solutions such as including a notch in the display where the sensors are placed. However, including a notch means that not all the area within the bezel is available for the display. Moreover, many people deem notches to be aesthetically unsightly, and thus represent a non-optimal solution.

Positioning certain front facing sensors, e.g., cameras, behind the display panel can be impractical because the display pixels and other components degrade the quality of a wavefront passing through the display, leading to blurry images.

SUMMARY

In general, in a first aspect, the disclosure features an apparatus that includes a camera; a primary display panel including a pixel array and an aperture adjacent the pixel array; an auxiliary display; and an optical assembly including a reflecting optical element and an actuator coupled to the reflecting optical element, the actuator being configured to switch the reflecting optical element between a first arrangement and a second arrangement. The first arrangement defines an optical path from the aperture to the camera and the second arrangement defines an optical path from the aperture to the auxiliary display.

Embodiments of the apparatus can include one or more of the following features. For example, the apparatus can include an electronic control module in communication with the camera, the display panel, the secondary display, and the actuator, the electronic control module being programmed to operate the camera when the optical assembly is in the first arrangement and to operate the secondary display when the optical assembly is in the second arrangement. The electronic control module is programmed to synchronize operation of the display panel and the secondary display to present a continuous image across the aperture in the display panel.

The display panel and the secondary display can have the same pixel density.

The display panel can be an OLED display panel.

The secondary display panel can be an OLED display.

The aperture can form a notch in the pixel array.

The reflecting optical element can be a prism including a reflecting surface. The actuator can be configured to rotate the prism to change an orientation of the reflecting surface with respect to the aperture axis.

The actuator can be configured to switch the reflecting optical element between one or more additional arrangements, wherein each of the one or more additional arrangements define a corresponding optical path from the aperture different from the optical paths of the first and second arrangements. Each of the optical paths of the additional arrangements are from the aperture to a sensor or emitter.

The apparatus can be a mobile phone or a tablet computer.

In general, in another aspect, the disclosure features a method that includes: receiving light through an aperture in a primary display panel; directing the light, via a reflecting optical element, to a camera located behind the primary display panel; acquiring an image of a scene in front of the primary display using the camera; reorienting the reflecting optical element to receive light from an auxiliary display located behind the primary display panel; and directing light from the auxiliary display panel, via the reflecting optical element, through the aperture, the light from the auxiliary display panel and light from the primary display panel providing the imagery displayed on the device.

Implementations of the method can include one or more of the following features. For example, the reflecting optical element is reoriented by rotating the reflecting optical element.

The reflecting optical element can be reoriented in response to a camera activation from a user of the device.

Among other advantages, implementations feature full-screen displays with front-facing sensors that do not include a notch. Rather, such implementations include an auxiliary display located beneath the primary display and an actuable reflector to switch the light path between the front-facing sensor and the auxiliary display.

The details of one or more implementations are set forth below. Other features and advantages will be apparent from the detailed description, the accompanying drawings, and the claims.

BRIEF DESCRIPTION OF THE DRAWINGS

Like references symbols in the various drawings indicate like elements.

DETAILED DESCRIPTION

Mobile devices (e.g., mobile phones, tablet computers) are disclosed that feature full-screen displays with a sub-display front-facing camera and/or other front facing sensors or devices. The devices feature a window in the display panel that permits the passage of light through the display panel in either direction. A sub-display module includes a flappable mirror or other actuable optic to direct light passing from or to the window along different paths. In one configuration (i.e., in an "imaging" or "selfie mode"), light passing through the window is directed towards a camera. The user has the perception that he/she is looking at a camera though he/she is actually looking at the mirror. In another mode (i.e., in a "display mode"), the light path is to an auxiliary display contained in the sub-display module. The user has the perception that he/she is looking at the display though he/she is actually looking at the mirror. Such mobile devices can feature full-screen displays with very small bezels.

Figure 1B:
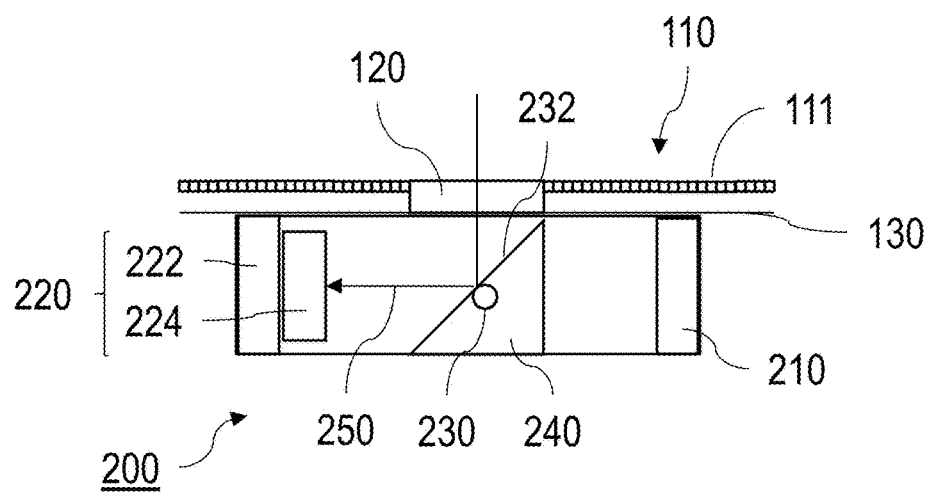
FIG. 1B is a cross-sectional view of a sub-display module of the mobile device shown in FIG. 1A. The module is arranged to direct light to the sub-display camera.
Figure 1A:
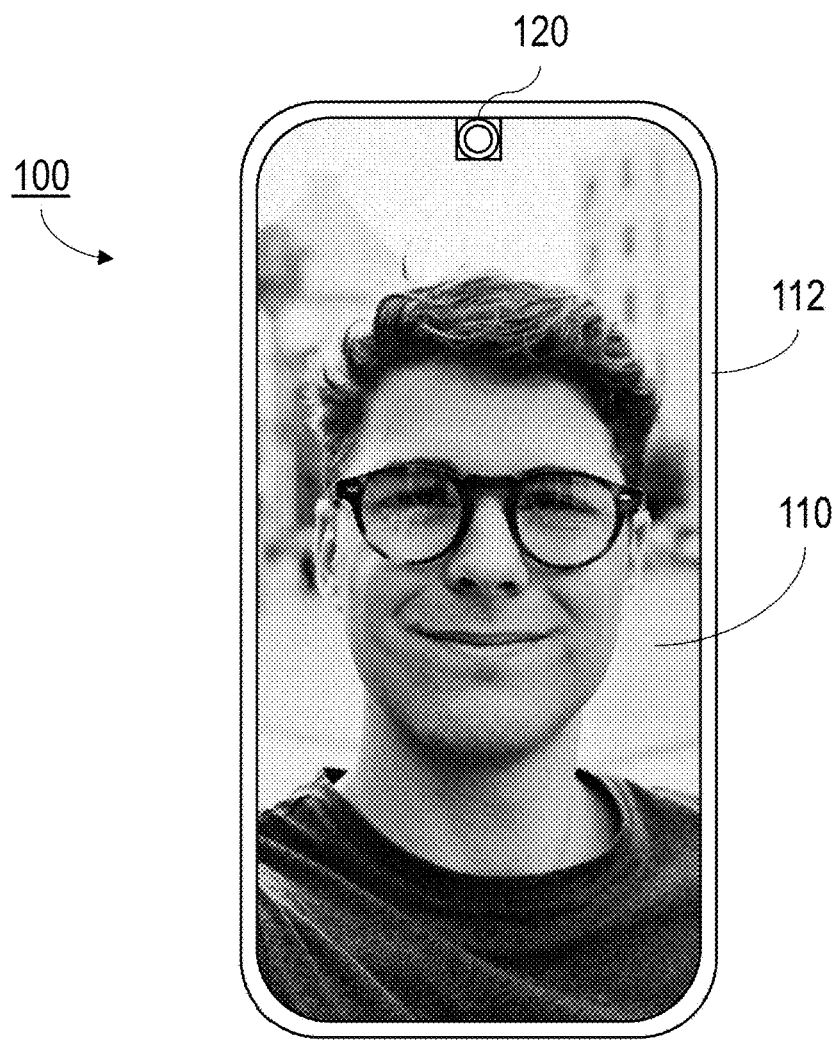
FIG. 1A is a plan view of an example mobile device featuring a full-screen display and a sub-display camera.

Referring to FIGS. 1A and 1B, an example mobile phone 100 includes a primary display panel 110 in a chassis that includes a bezel 112. Display panel 110 is an organic light emitting diode (OLED) display and includes an array of light emitting pixels 111 supported by a substrate 130. Display panel 110 also includes a window 120 located at a top edge of the display. Window 120 provides an aperture through which light can pass to a sub-display optical module 200 located behind display panel 110. The top surface of window 120 sits flush with the top surface of display panel 110, providing a seamless front surface to the user.

Optical module 200 includes an auxiliary display panel 210 and a camera 220. Camera 220 includes a lens assembly 222 (e.g., including one or more lens elements) and a sensor array 224 (e.g., a CMOS or CCD array). A reflecting optic 240 is located between auxiliary display 210 and camera 220. Reflecting optic 240 includes a reflective surface 232, which redirects light transmitted through window 120 as described in more detail below. A rotary actuator 230 is coupled to reflecting prism 240 and is configured to change the orientation of reflective surface 232 with respect to window 120, thereby controlling the direction of light transmitted by the window.

Generally, reflecting optic 240 can be any appropriate optic that specularly reflects incident light in the visible part of the spectrum. For example, reflecting optic 240 can be a prism with a mirrored surface (e.g., a surface coated with a reflecting material, such as silver or aluminum). Multiple layer optical reflectors can also be used. In some embodiments, MEMS devices, such as MEMS mirror arrays, can be used to redirect light to and from window 120.

Actuator 230 can be any appropriate rotary actuator capable of rotating reflecting optic 240 back and forth between two positions. In many cases, actuator 230 is an electric actuator. In some embodiments, actuator 230 is a stepper actuator.

As depicted in FIGS. 1A and 1B, device 100 is in an imaging mode in which the front-facing camera, i.e., camera 220, is activated. In this arrangement, rotating actuator 230 orients reflecting prism 240 so that reflecting surface 232 directs light transmitted from the front of the device through window 120 towards camera 220. This allows camera 220 to acquire images of the scene in front of mobile device 100.

Figure 2B:
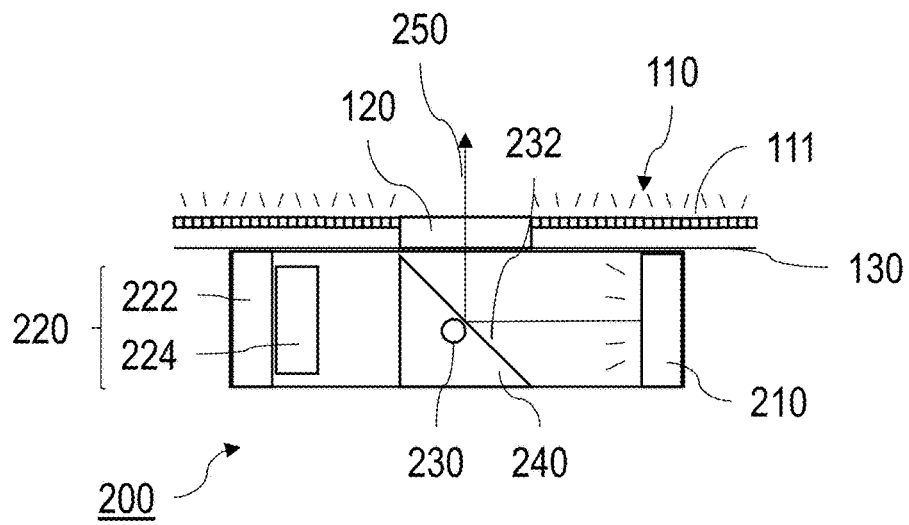
FIG. 2B is a cross-sectional view of the sub-display module of the mobile device shown in FIG. 2A. The module is arranged to direct light from the auxiliary display to the user.
Figure 2A:
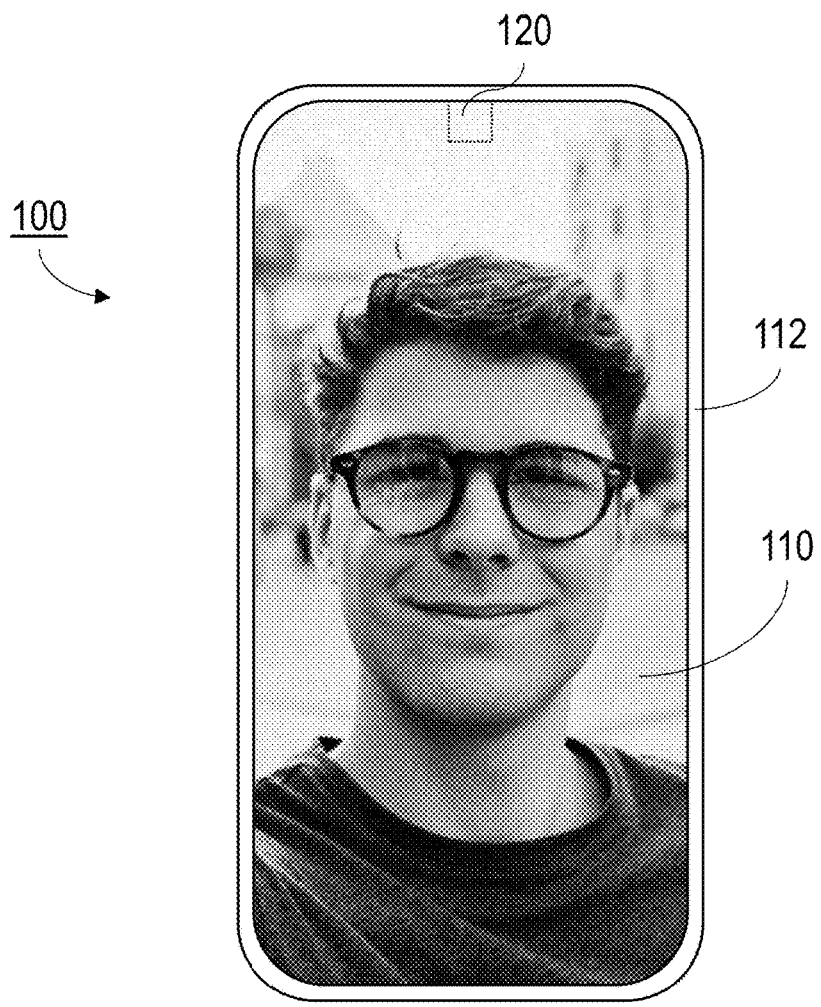
FIG. 2A is a plan view of the mobile device shown in FIG. 1A, with the sub-display module being arranged to direct light from an auxiliary display to a user.

Referring to FIGS. 2A and 2B, when the front-facing camera is not engaged reflecting surface 232 is directed towards auxiliary display 210. In this arrangement, reflecting surface 232 directs light emitted from the auxiliary display through window 120. Accordingly, a user looking at primary display 110 sees the image display on the auxiliary display in window 120. A controller, discussed below, coordinates operation of primary display 110 and auxiliary display 210 so that the displays collectively present the user with a seamless image.

In general, the size and shape of window 120 can vary as appropriate and should be sufficiently large to provide an appropriate aperture for both camera 220 and auxiliary display panel 210. In some embodiments, window 120 is square or rectangular with a diagonal dimension in a range from 1 mm to 10 mm (e.g., about 1 mm to 5 mm, such as about 2 mm or about 3 mm). Other shapes are also possible, such as other polygons, round, oval, polygons with rounded corners, and irregular shapes.

Furthermore, the auxiliary display panel can have a pixel density that is the same as or different from the pixel density of the primary display panel. In some embodiments, the auxiliary display features a lower pixel density than the primary display. For example, where the window is located in a part of the primary display commonly used to display images that are lower resolution than, e.g., photos or movies, such as icons, the auxiliary display can have a lower pixel density than the primary display.

While the foregoing example features a window in the middle of the top edge of the primary display, more generally, the window can be located in any appropriate location of the primary display panel. For example, the window can be located at or close to a corner of the display. In some embodiments, the window can be located at a long edge of the display, at the bottom edge of the display, or away from an edge (e.g., in which the window is surrounded on all sides by pixels of the primary display).

Alternatively, or additionally, in some cases the optical module containing the auxiliary display panel and camera can include additional optical elements. For example, in some cases, a module includes additional optical elements, such as one or more lenses, in the optical path from the auxiliary display to the user. Such optical elements can form an image of the auxiliary display in the same plane as the primary display.

Figure 3B:
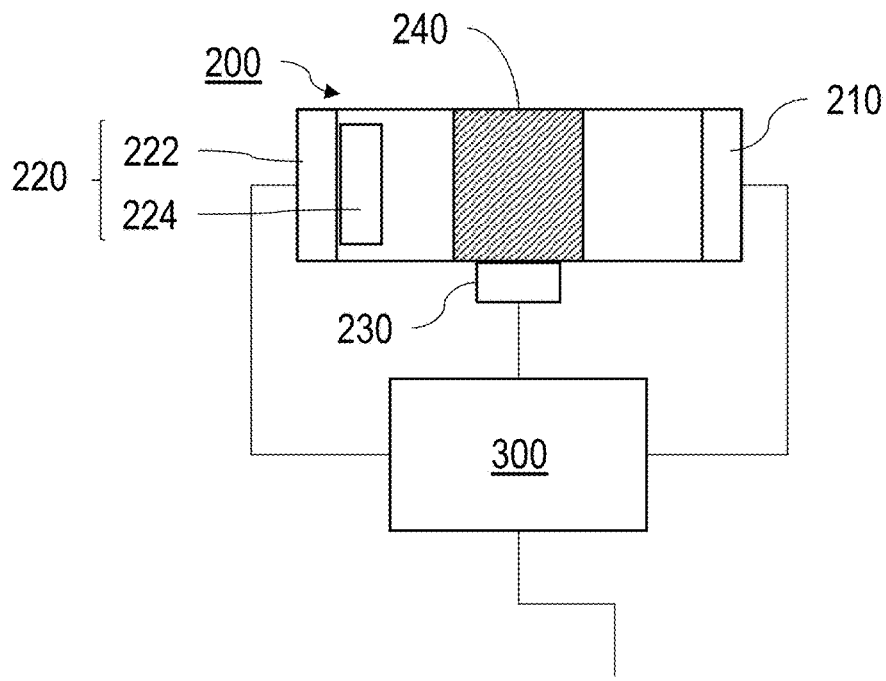
FIG. 3B is a schematic view of the sub-display module and associated electronic components.
Figure 3A:
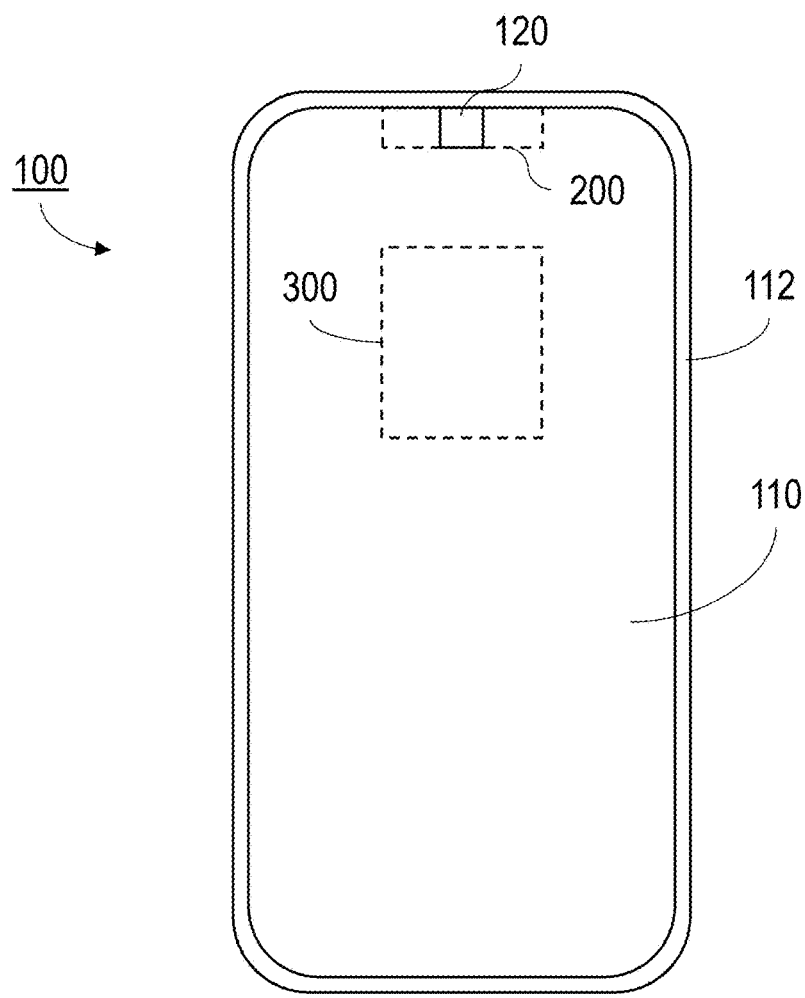
FIG. 3A is a plan view of the mobile device shown in FIGS. 1A and 2A, in which the location of sub-display module and associated electronic components is shown.
Figure 4:
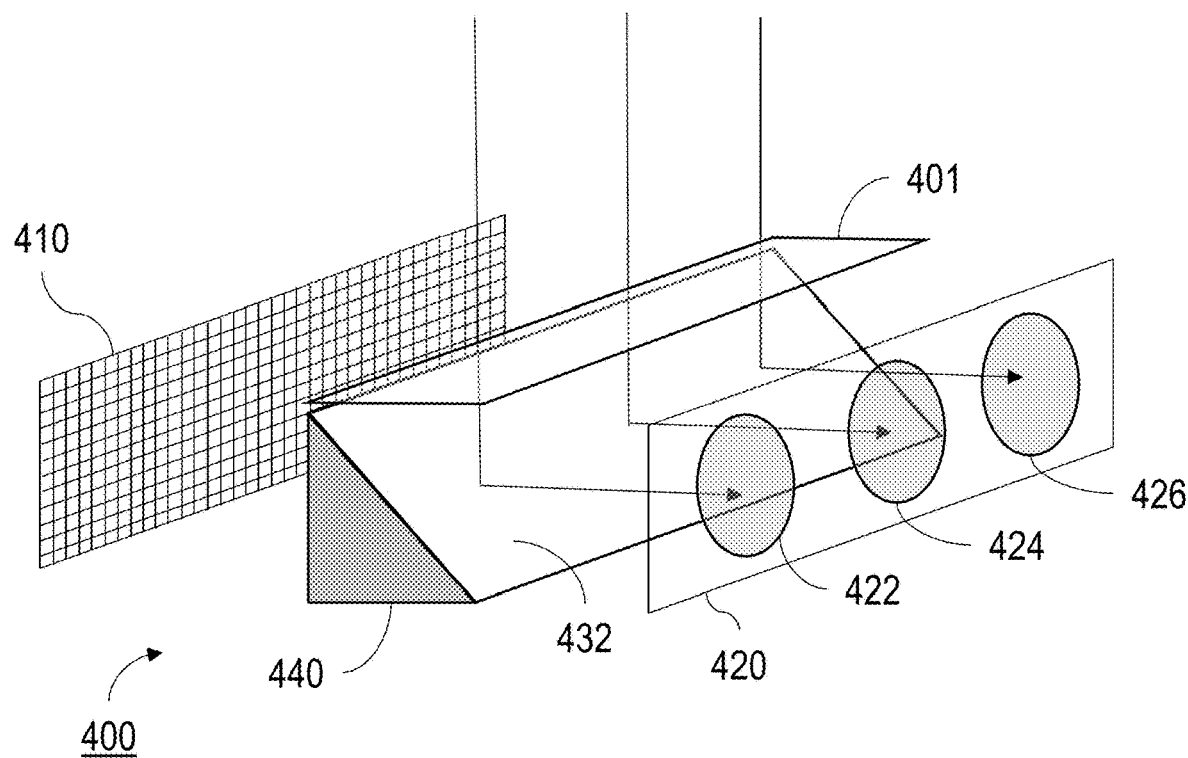
FIG. 4 is a perspective view of another example of a sub-display module containing multiple different sensors.

Referring to FIGS. 3A and 3B, mobile device 100 includes an electronic control module 300 that is electrically-connected to auxiliary display 210, camera 220, and rotary actuator 230. Electronic control module 300 is also in electrical communication with drive electronics for display panel 110. Control module 300 is programmed to coordinate and control operation of the sub-display module 200 and primary display panel 110. For example, when a user activates imaging mode, control module 300 sends control signals to actuator 230, causing the actuator to rotate the reflecting surface 232 to face the camera 220, while at the same time turning off auxiliary display 220 and activating camera 220.

When the user deactivates the imaging mode, control module 300 sends control signals to actuator 230 to cause it to rotate reflecting surface 232 in the opposite direction to face auxiliary display 210. Control module 300 further coordinates operation of the primary and auxiliary displays Various implementations of the subject matter described herein (e.g., the electronic control module 300, primary display 110, auxiliary display 210, camera 220 and/or any other component associated with the mobile device and/or the primary display) can be implemented in conjunction with digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly or machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, primary display 110 can display data to a user. Camera 220 and/or other front-facing sensors can receive data from the one or more users and/or the ambient environment. Controller 300 can thus operate based on user or other feedback, which can include sensory feedback, such as visual feedback, auditory feedback, tactile feedback, and any other feedback. To provide for interaction with the user, other devices can also be provided, such as a keyboard, a mouse, a trackball, a joystick, and/or any other device. The input from the user can be received in any form, such as acoustic input, speech input, tactile input, or any other input.

While the foregoing example features an optical module that includes a camera and an auxiliary display, other arrangements are also possible. For example, in some embodiments, an optical module can include further sensors behind display panel 110 in addition to a camera. Referring to 4a, an example of such an optical module 400 includes an auxiliary display 410 along with a sensor module 420 that includes three sensors 422, 424, and 426. An actuable reflector 440 that includes a reflecting surface 432 (e.g., a mirror) provides an optical path from a window 401 in a primary display panel (not shown) that switches between auxiliary display 410 and sensor module 420. In embodiments where one or more of the sensors detect and/or emit non-visible wavelengths (e.g., IR sensors can include infrared emitters and detectors), reflecting surface 432 reflects both visible and non-visible (e.g., IR) radiation. In some cases, the different sensors can be integrated onto a common substrate. Alternatively, the module can be composed of separately packaged sensors arranged side-by-side.

Of course, sensor module 420 is just an illustrative example. Generally, sensor modules can include any number of appropriate sensors (e.g., two, three, four or more) arranged in any appropriate configuration (e.g., side-by-side, staggered, stacked or combinations thereof).

Figure 5:
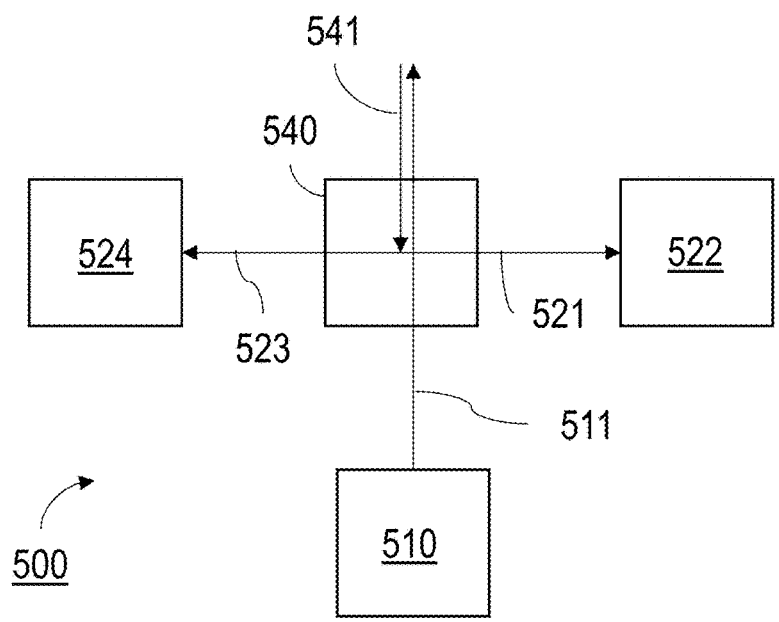
FIG. 5 is a schematic illustrating an example of a sub-display module capable of directing light along more than two optical paths.

While the foregoing examples feature an actuable reflector that can direct light along two different optical paths, other configurations are possible. For example, in some embodiments, a sub-display module can directly light along three or more optical paths. Referring to FIG. 5, for example, a sub-display module 500 includes a light directing element (e.g., rotatable reflector) that directs light 541 transmitted by a window through a primary display (neither are shown in FIG. 5) along one of three different paths. In this example, two of the paths, 521 and 523, lead to 2 sensors, 522 and 524, respectively. The third path, 511, directs light between an auxiliary display 510 and the window.

Although various implementations have been described above in detail, other modifications can be possible. For example, while the foregoing examples use OLED displays for the primary and auxiliary display, it is possible to use other appropriate display technologies. Moreover, the primary and auxiliary display can use different types of display technology, such as liquid crystal display (LCD) technology or micro-light emitting diode (microLED) technology. For example, the primary display can be a LCD while the auxiliary display is an OLED or micro-LED display.

Other implementations are within the scope of the following claims.

What is claimed is:

1. An apparatus, comprising:
   a primary display having a front side and a rear side opposite the front side, the primary display comprising a first pixel array configured to emit light visible from the front side, the primary display defining an aperture adjacent the first pixel array;
   a camera arranged at the rear side of the primary display;
   an auxiliary display arranged at the rear side of the primary display, the auxiliary display comprising a second pixel array;
   an optical assembly configured to selectively switch light transmitted through the aperture among two different optical paths at the rear side of the primary display, wherein:
   a first optical path of the two different optical paths at the rear side the primary display is configured to direct light transmitted through the aperture from in front of the primary display to the camera; and
   a second optical path of the two different optical paths at the rear side of the primary display is configured to direct light from the auxiliary display through the aperture of the primary display; and
   an electronic control module in communication with the camera, the primary display, the auxiliary display, and the optical assembly, the electronic control module being programmed to switch the optical assembly from the first optical path to the second optical path, and from the second optical path to the first optical path.

2. The apparatus of claim 1, wherein the electronic control module is programmed to operate the camera when the optical assembly directs light transmitted through the aperture from in front of the primary display along the first of the different optical paths.

3. The apparatus of claim 1, wherein the electronic control module is programmed to synchronize operation of the primary display and the auxiliary display to present a continuous image across the aperture in the primary display.

4. The apparatus of claim 1, wherein the primary display and the auxiliary display have the same pixel density.

5. The apparatus of claim 1, wherein the primary display is an OLED display.

6. The apparatus of claim 1, wherein the auxiliary display is an OLED display.

7. The apparatus of claim 1, wherein the aperture forms a notch in the first pixel array.

8. The apparatus of claim 1, wherein the optical assembly comprises a reflecting optical element arranged to reflect light transmitted through the aperture from the front side of the primary display to the camera when the optical assembly is switched to the first of the different optical paths.

9. The apparatus of claim 8, wherein the reflecting optical element is a prism comprising a reflecting surface.

10. The apparatus of claim 8, wherein the optical assembly further comprises an actuator configured to switch the reflecting optical element between different orientations.

11. The apparatus of claim 1, wherein the optical assembly comprises a Micro-electromechanical Systems (MEMS) device.

12. The apparatus of claim 1, wherein the camera is located behind the first pixel array.

13. The apparatus of claim 12, wherein the auxiliary display is located at the rear side of the primary display.

14. The apparatus of claim 1, wherein the apparatus is a mobile phone.

15. The apparatus of claim 1, wherein the apparatus is a tablet computer.

16. A method, comprising:
when a device is in a first configuration, directing light emitted from an auxiliary display located behind a primary display through an aperture in the primary display, the light emitted from the auxiliary display and light emitted from the primary display providing an image displayed on the device;
switching, by electronics of the device, the device from the first configuration to a second configuration;
when the device is in the second configuration, receiving light from in front of the primary display through the aperture and directing the received light to a camera located behind the primary display; and
while the device is in the second configuration, acquiring an image of a scene in front of the primary display using the camera.

17. The method of claim 16, wherein switching the device from the first configuration to the second configuration comprises switching an optical assembly located behind the aperture to direct light along different optical paths.

18. The method of claim 17, wherein the optical assembly comprises a reflecting optical element and switching an optical assembly comprises reorienting the reflecting optical element.

19. The method of claim 16, wherein the device is switched from the first configuration to the second configuration in response to a camera activation from a user of the device.

20. The method of claim 16, wherein the device is a mobile phone.

\* \* \* \* \*